United States Patent
Adema et al.

(10) Patent No.: US 12,181,671 B2
(45) Date of Patent: Dec. 31, 2024

(54) SYSTEMS, DEVICES, AND METHODS FOR INPUTTING LIGHT FROM A SCANNING PROJECTOR INTO A WAVEGUIDE

(71) Applicant: GOOGLE LLC, Mountain View, CA (US)

(72) Inventors: Daniel Adema, Kitchener (CA); Timothy Paul Bodiya, Toronto (CA)

(73) Assignee: GOOGLE LLC, Mountain View, CA (US)

( * ) Notice: Subject to any disclaimer, the term of this patent is extended or adjusted under 35 U.S.C. 154(b) by 573 days.

(21) Appl. No.: 17/217,673

(22) Filed: Mar. 30, 2021

(65) Prior Publication Data

US 2022/0269079 A1 Aug. 25, 2022

Related U.S. Application Data

(60) Provisional application No. 63/003,561, filed on Apr. 1, 2020.

(51) Int. Cl.
| | | |
|---|---|---|
| *G02B 27/01* | (2006.01) | |
| *F21V 8/00* | (2006.01) | |
| *G02B 26/08* | (2006.01) | |
| *G02B 26/10* | (2006.01) | |

(52) U.S. Cl.
CPC ....... *G02B 27/0172* (2013.01); *G02B 6/0031* (2013.01); *G02B 26/0833* (2013.01); *G02B 26/105* (2013.01); *G02B 27/0176* (2013.01); *G02B 2027/0154* (2013.01)

(58) Field of Classification Search
CPC ............ G02B 27/0172; G02B 27/0176; G02B 2027/0178; G02B 2027/0154; G02B 26/0833; G02B 6/0031
See application file for complete search history.

(56) References Cited

U.S. PATENT DOCUMENTS

| | | | | |
|---|---|---|---|---|
| 2011/0109971 A1* | 5/2011 | Beach | ................... | G02B 17/026 |
| | | | | 359/896 |
| 2016/0278695 A1* | 9/2016 | Wang | .................... | A61B 5/7445 |
| 2016/0349514 A1* | 12/2016 | Alexander | ............... | G02B 5/32 |
| 2017/0113599 A1* | 4/2017 | Park | .................... | G02B 26/0833 |

(Continued)

FOREIGN PATENT DOCUMENTS

| | | | | | |
|---|---|---|---|---|---|
| CN | 108027519 | A | * | 5/2018 | ......... G02B 27/0172 |
| CN | 113272717 | A | * | 8/2021 | ......... G02B 27/0081 |

(Continued)

OTHER PUBLICATIONS

WO-2018043625-A1 (English Translation) (Year: 2018).*

(Continued)

*Primary Examiner* — Balram T Parbadia
*Assistant Examiner* — Mary A El-Shammaa (57) ABSTRACT

Systems and methods for incoupling light into a waveguide. A system includes a transfer optic and an optical scanner being configured to receive light from an optical engine. The optical scanner includes a first scan mirror positioned close to the transfer optic. The system further includes a waveguide with an incoupler positioned close to the transfer optic, which is configured to direct the light from the optical engine to the first scan mirror and to transmit light reflected from the first scan mirror to one of a second scan mirror or the incoupler of the waveguide.

18 Claims, 7 Drawing Sheets

(56) References Cited

U.S. PATENT DOCUMENTS

| | | | |
|---|---|---|---|
| 2018/0088325 A1* | 3/2018 | Brown | G02B 27/30 |
| 2018/0129054 A1* | 5/2018 | Morrison | G02B 5/32 |
| 2018/0129055 A1* | 5/2018 | Morrison | G02B 5/32 |
| 2019/0056596 A1* | 2/2019 | Bailey | G03H 1/265 |
| 2019/0229495 A1* | 7/2019 | Pierer | G02B 26/101 |
| 2019/0230262 A1* | 7/2019 | Wang | H04N 23/56 |
| 2020/0026069 A1* | 1/2020 | Nicholson | G09G 3/02 |
| 2020/0026080 A1* | 1/2020 | Pierer | H01S 5/023 |
| 2020/0082790 A1* | 3/2020 | Moore | G09G 5/10 |
| 2020/0225468 A1* | 7/2020 | Bodiya | G02B 27/0081 |
| 2020/0225480 A1* | 7/2020 | Bodiya | G02B 6/0031 |
| 2021/0063636 A1* | 3/2021 | Shin | G02B 6/0028 |
| 2021/0109362 A1* | 4/2021 | Wheelwright | G02B 9/06 |
| 2021/0165226 A1* | 6/2021 | Ide | G02B 27/0179 |
| 2022/0197035 A1* | 6/2022 | Adema | G02B 5/1819 |
| 2023/0228985 A1* | 7/2023 | Adema | G02B 27/0172 359/199.1 |

FOREIGN PATENT DOCUMENTS

| | | | | |
|---|---|---|---|---|
| CN | 115004082 A | * | 9/2022 | G02B 27/0081 |
| WO | WO-2014202726 A1 | * | 12/2014 | F21S 41/13 |
| WO | WO-2018043625 A1 | * | 3/2018 | G02B 26/101 |
| WO | WO-2023018774 A1 | * | 2/2023 | G02B 26/105 |

OTHER PUBLICATIONS

CN-115004082-A (English Translation) (Year: 2022).*
CN-113272717-A (English Translation) (Year: 2021).*
CN-108027519-A (English Translation) (Year: 2018).*
English Translation (Year: 2018).*
English Translation (Year: 2022).*

* cited by examiner

SYSTEMS, DEVICES, AND METHODS FOR INPUTTING LIGHT FROM A SCANNING PROJECTOR INTO A WAVEGUIDE

CROSS-REFERENCE TO RELATED APPLICATION

The present application claims priority to U.S. Provisional Patent Application Ser. No. 63/003,561, entitled "Optical Systems", and filed on Apr. 1, 2020, the entirety of which is incorporated by reference herein.

BACKGROUND

A scanning projector is an image display device that generally collimates light using specialized lenses and then scans the collimated light in a two-dimensional direction (horizontal direction and vertical direction) onto a projection surface to form an image or sequence of images. An example of such a projector is a laser projector, which generally includes multiple laser light sources that each generate laser light of a specific wavelength in order to produce laser light beams of different colors, for example, red, green, and blue colored laser light. In addition to the laser light sources, a conventional laser projector includes at least one scan mirror, that scans (or reflects) the laser light emitted from the laser light sources in at least one direction. Articulation of the scan mirror(s) may be accomplished by a micro-electromechanical system (MEMS) that moves the mirror(s) in response to actuation voltages provided by a power source associated with the laser projector.

Laser projectors can be incorporated into a variety of devices, including wearable heads-up displays (WHUDs) that are designed to be worn on the head of a user to generate images, which are projected for viewing by a user via a waveguide positioned in front of a user's eye. WHUDs are typically configured such that a user views the images on a transparent surface in front of their eye(s) to display, for example, augmented reality (AR) content, or such that a user views the images on an opaque surface that typically blocks light from the environment to create a virtual reality (VR) experience. In some cases, a WHUD includes a laser projector to generate light representing images that are then conveyed to the waveguide, which transmits the light representing the images to a user's eye. In a WHUD that is designed to have the general shape and appearance of eyeglasses or goggles, the waveguide is typically implemented in the "lens" portion (which may be fully or partially transparent, or entirely opaque), while the laser projector and other components, such as a controller and power source, are housed in the frame portion. Due to limited available space for components in the frame, and to ensure that the device is comfortable for a user to wear, it is typically desirable that the laser projector, battery, and other components be relatively small, light, and capable of functioning in a small volume of space.

BRIEF DESCRIPTION OF THE DRAWINGS

The present disclosure is best understood, and its numerous features and advantages made apparent to those skilled in the art by referencing the accompanying drawings. The use of the same reference symbols in different drawings indicates similar or identical items.

DETAILED DESCRIPTION

Due to the limited space available in the frame of a WHUD, it is desirable that components and their relative locations are designed to function in a relatively small volume of space. In addition, the quality of the image displayed to a user of a WHUD is based, in part, on how much of the light from the laser projector is conveyed to the user's eye via the waveguide. Thus, it is desirable to minimize light loss from the system as the light is reflected and refracted from the various components. One area where light may be lost is at the incoupler through an effect known as "double-bounce". To illustrate, in some WHUDs, the incoupler of a waveguide is implemented as a diffraction grating disposed at a surface of the waveguide, wherein the diffraction grating diffracts different wavelengths of the laser projector light at different angles. Because of these different diffraction angles, the different wavelengths of the display light have different angles of propagation within the waveguide and therefore have different distances between total internal reflection (TIR) bounces within the waveguide after being transmitted or reflected by a diffraction grating incoupler. That is, light diffracted at a relatively steep angle (relative to normal) will bounce a greater number of times within a given length than light diffracted at a more gradual angle. The different diffraction angles of each wavelength of light can cause some light to be lost from the waveguide through the double bounce effect, wherein light that is transmitted or reflected by the incoupler a first time at a relatively steep angle may be incident on the incoupler a second time as a result of being reflected from a surface of the waveguide back towards the incoupler. When the light is incident on the incoupler for a second time, some of the light is transmitted or reflected out of the waveguide (i.e., "lost") and, as a consequence, less light than was originally emitted from the laser projector is transmitted through the waveguide to a user's eye resulting in reduced brightness of the image displayed to a user and a diminished user experience.

In a WHUD employing a laser projector, at least one articulating scan mirror is typically utilized to direct light from the laser projector to the incoupler of a waveguide. Because a scan mirror functions to reflect light at various angles as it is articulated, the combined paths of the reflected light beams typically form a triangle, in the case of a one-dimensional scan mirror, or a cone or pyramid, in the case of a two-dimensional scan mirror, with the apex of the triangle or cone being located at the reflective surface of the scan mirror. As the light beams are reflected from the scan mirror, they radiate out from the apex based on the angles over which the scan mirror is articulated relative to the path of the input light beams. Thus, the area over which the reflected light beams are directed increases in size as the distance from the scan mirror increases. This expanding triangle or pyramid is referred to as the "cone of propagation". Accordingly, the size of the components (e.g., lenses) that are intended to receive the light beams reflected from the scan mirror increases as their distance from the scan mirror increases in order to maximize the number of light beams incident on the component.

For example, some WHUDs include an optical relay of at least two lenses positioned between a scan mirror and an incoupler of a waveguide. The first lens closest to the scan mirror interrupts the cone of propagation of the light reflected from the scan mirror and redirects the reflected light to the second lens that is positioned closest to the incoupler. The size of the first lens is based on its distance from the scan mirror to ensure that all of the light in the cone of propagation from the scan mirror is incident on the first lens. The second lens is typically the same size as the first lens and is configured to refract the light from the first lens so that it converges at the incoupler of the waveguide. A benefit of employing such an optical relay is that the incoupler area of the waveguide can be relatively small because of the convergence of the light by the second lens. That is, the second lens in the optical relay condenses the light into a relatively small area, thus the incoupler does can also be small and still capture all, or most, of the light refracted by the second lens. A relatively small incoupler is also helpful in preventing light loss resulting from a double-bounce because the likelihood that light will be incident on the incoupler more than once is reduced. However, an optical relay requires a minimum distance between each of the components in order to function effectively, thus the space needed for the components of an optical relay in the WHUD is relatively large.

Another manner of conveying light from the scan mirror to the incoupler is to forgo the use of optical relay components to allow light reflected from the scan mirror to be directly incident on the incoupler. This configuration is more compact than a system with an optical relay because the scan mirror can be located quite close to the incoupler and no space is taken up by lenses. However, in such a system, the size of the incoupler is determined by the size of the area at which the incoupler interrupts the cone of propagation of the light reflected from the scan mirror. The result is an incoupler that is typically larger than an incoupler of a system employing an optical relay. A larger incoupler increases the chances that light entering the waveguide will be incident on the incoupler more than once, resulting in light loss from the waveguide due to the double-bounce effect.

FIGS. 1-8 illustrate embodiments of example apparatuses and techniques to reduce distance between components in a WHUD, such as between a scan mirror and an incoupler of a waveguide, and to thereby reduce light loss from the system due to the double-bounce effect. It should be noted that, although some embodiments of the present disclosure are described and illustrated with reference to a particular example near-eye display system in the form of a wearable-heads-up display (WHUD), it will be appreciated that the apparatuses and techniques of the present disclosure are not limited to this particular example, but instead may be implemented in any of a variety of display systems using the guidelines provided herein. It should also be noted that, although some embodiments of the present disclosure are described and illustrated with reference to laser light, as provided by a laser projector, it will be appreciated that the apparatuses and techniques of the present disclosure are not limited to this particular example, but instead may be implemented in a variety of systems that provide collimated light to an optical scanner.

An optical scanner, such as described in greater detail below with reference to FIG. 2, includes a transfer optic located in the optical path of light provided by an optical engine to a scan mirror and in the optical path of light reflected from the scan mirror towards an incoupler of a waveguide. The transfer optic serves to direct light from an optical engine, such as a laser projector, onto the scan mirror and to transmit light reflected from the scan mirror to either a second scan mirror or to the incoupler of a waveguide. In some embodiments, the transfer optic is a prism including at least one surface configured to reflect light received from an optical engine. The transfer optic allows the scan mirror to be placed in close proximity to the waveguide such that the light reflected from the scan mirror is provided to the incoupler. The close proximity of the scan mirror to the waveguide means that the incoupler interrupts the cone of propagation of light reflected from the scan mirror relatively close to the apex of the cone or triangle, such that the incoupler can be relatively small (e.g., equal to, or less than one and half times, the size of the light beam received by the incoupler) and still receive most or all of the light reflected from the scan mirror. A small incoupler also minimizes the chances that light will be incident on the incoupler a second time once it has entered the waveguide, thus minimizing light loss from the system due to the double-bounce effect. It should be noted that, although some embodiments of the present disclosure are described and illustrated with reference to particular examples of laser projection systems that do not include an optical relay, the transfer optic may also be used in laser projection systems that include an optical relay in order to shorten distances between the relay components and/or reduce the size of the relay components (e.g., reduced size of lenses in the optical relay).

In some embodiments, the transfer optic is a prism with an index of refraction configured to reduce the refraction angle of the light reflected from a scan mirror such that the size of the combined beams of reflected light is smaller than if the beams traveled through the air. That is, the space between individual beams of light reflected from the scan mirror is reduced by the transfer optic relative to the distance between those same beams if they were to travel through air. In embodiments that include a second scan mirror, the consolidation of the beams of light reflected from the first scan mirror by the transfer optic allows for use of a relatively small second scan mirror to receive the consolidated beams of light. As the power to articulate a scan mirror is proportional to its size, a smaller scan mirror utilizes less power, thus potentially increasing the operating time and/or reducing the battery size of a WHUD employing the transfer optic. Conversely, if a larger field of view (FOV) is desired, the consolidating effect of the transfer optic allows for the size of the combined beams of light input to the optical scanner to be relatively large without necessitating a larger second scan mirror to receive the reflected beams.

Figure 1:
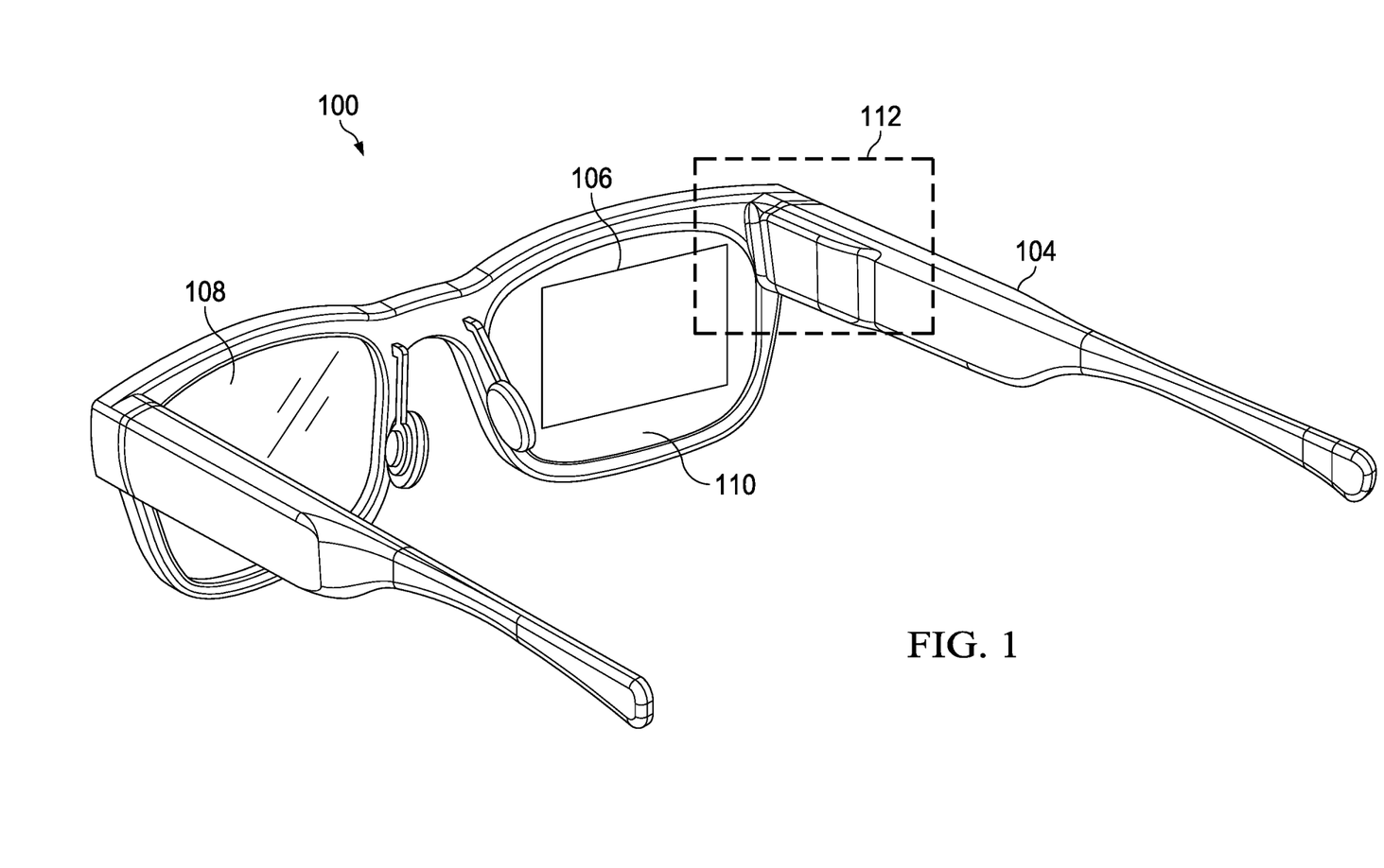
FIG. 1 shows an example image display system employing a scanning-based projection system, in accordance with some embodiments.

FIG. 1 illustrates an example display system 100 employing a scanning-based projection system in accordance with some embodiments. The display system 100 has a support structure 102 that includes an arm 104, which houses a laser projection system configured to project images toward the eye of a user, such that the user perceives the projected images as being displayed in a field of view (FOV) area 106 of a display at one or both of lens elements 108, 110. In the depicted embodiment, the display system 100 a near-eye display system in the form of a WHUD in which the support structure 102 is configured to be worn on the head of a user and has a general shape and appearance (or "form factor") of an eyeglasses frame. The support structure 102 contains, or otherwise includes, various components to facilitate the projection of such images toward the eye of the user, such as a laser projector, an optical scanner, and a waveguide. In some embodiments, the support structure 102 further includes various sensors, such as one or more front-facing cameras, rear-facing cameras, other light sensors, motion sensors, accelerometers, and the like. The support structure 102 can further include one or more radio frequency (RF) interfaces or other wireless interfaces, such as a Bluetooth™ interface, a WiFi interface, and the like. Further, in some embodiments, the support structure 102 further includes one or more batteries or other portable power sources for supplying power to the electrical components of the display system 100. In some embodiments, some or all of these components of the display system 100 are fully or partially contained within an inner volume of support structure 102, such as within the arm 104 in region 112 of the support structure 102. It should be noted that while an example form factor is depicted, it will be appreciated that in other embodiments the display system 100 may have a different shape and appearance from the eyeglasses frame depicted in FIG. 1.

One or both of the lens elements 108, 110 are used by the display system 100 to provide an augmented reality (AR) display in which rendered graphical content can be superimposed over or otherwise provided in conjunction with a real-world view as perceived by the user through the lens elements 108, 110. For example, laser light used to form a perceptible image or series of images may be projected by a laser projector of the display system 100 onto the eye of the user via a series of optical elements, such as a waveguide formed at least partially in the corresponding lens element, one or more scan mirrors, and one or more optical relays. One or both of the lens elements 108, 110 thus include at least a portion of a waveguide that routes display light received by an incoupler of the waveguide to an outcoupler of the waveguide, which outputs the display light toward an eye of a user of the display system 100. The display light is modulated and scanned onto the eye of the user such that the user perceives the display light as an image. In addition, each of the lens elements 108, 110 is sufficiently transparent to allow a user to see through the lens elements to provide a field of view of the user's real-world environment such that the image appears superimposed over at least a portion of the real-world environment.

In some embodiments, the projector is a digital light processing-based projector, a scanning laser projector, or any combination of a modulative light source such as a laser or one or more light-emitting diodes (LEDs) and a dynamic reflector mechanism such as one or more dynamic scanners or digital light processors. In some embodiments, the projector includes multiple laser diodes (e.g., a red laser diode, a green laser diode, and a blue laser diode) and at least one scan mirror (e.g., two one-dimensional scan mirrors, which may be micro-electromechanical system (MEMS)-based or piezo-based). The projector is communicatively coupled to the controller and a non-transitory processor-readable storage medium or memory storing processor-executable instructions and other data that, when executed by the controller, cause the controller to control the operation of the projector. In some embodiments, the controller controls a scan area size and scan area location for the projector and is communicatively coupled to a processor (not shown) that generates content to be displayed at the display system 100.

The projector scans light over a variable area, designated the FOV area 106, of the display system 100. The scan area size corresponds to the size of the FOV area 106 and the scan area location corresponds to a region of one of the lens elements 108, 110 at which the FOV area 106 is visible to the user. In some embodiments, at least a portion of an outcoupler of the waveguide may overlap the FOV area 106. Generally, it is desirable for a display to have a wide FOV to accommodate the outcoupling of light across a wide range of angles. Herein, the range of different user eye positions that will be able to see the display is referred to as the eyebox of the display. In some embodiments, the projector routes light via at least one scan mirror, a transfer optic, and a waveguide disposed at the output of the transfer optic. Particular embodiments of these aspects are described in greater detail below.

Figure 2:
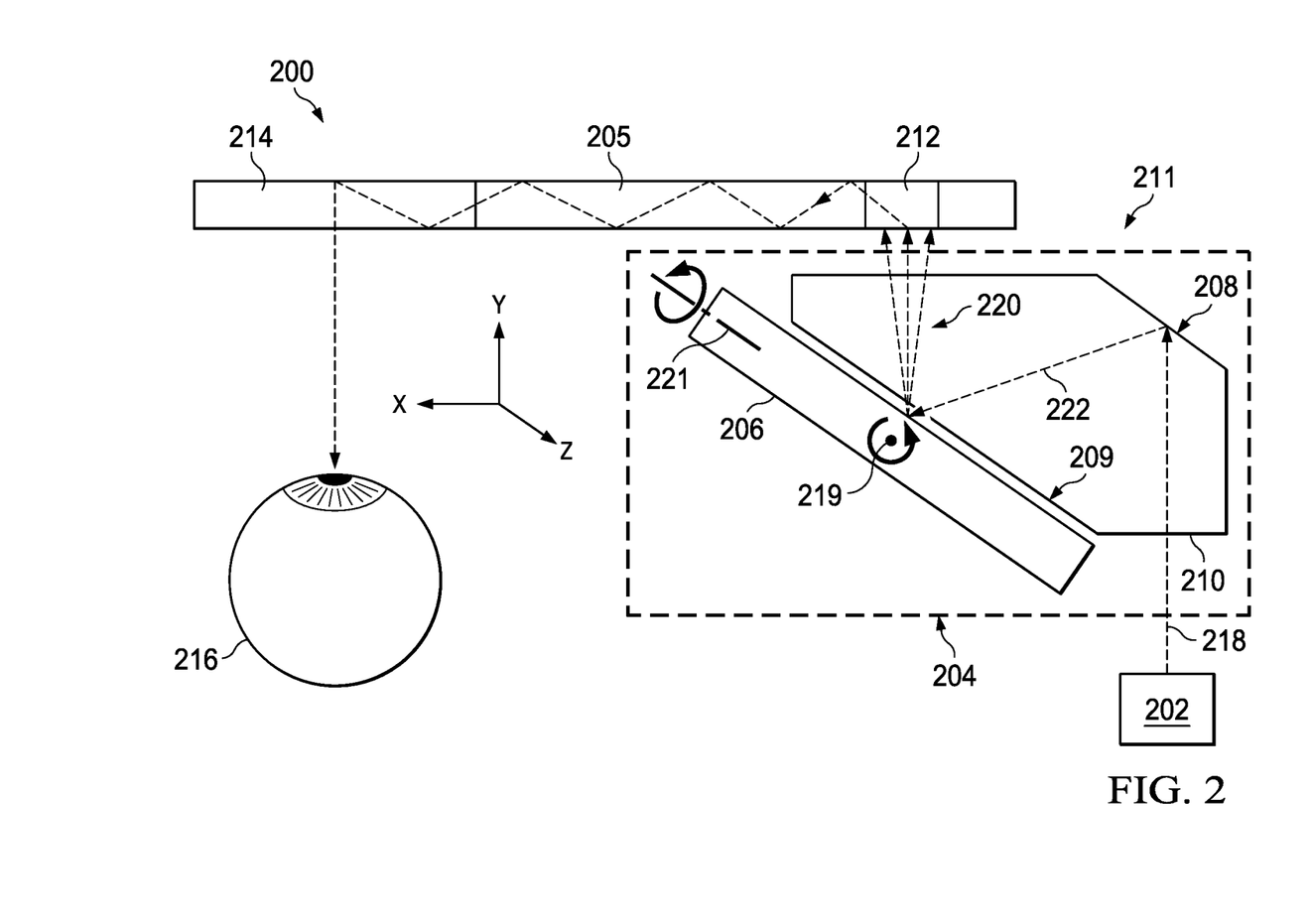
FIG. 2 shows a simplified block diagram of a laser projection system, including a transfer optic, that projects images directly onto the eye of a user via an image display system such as that shown in FIG. 1, in accordance with some embodiments.

FIG. 2 illustrates a simplified block diagram of a laser projection system 200, including a transfer optic 210, that projects images directly onto the eye of a user via a display system, such as display system 100 of FIG. 1. The laser projection system 200 includes an optical engine 202, an optical scanner 204, and a waveguide 205. The optical scanner 204 includes a first scan mirror 206 and a transfer optic 210. The waveguide 205 includes an incoupler 212 and an outcoupler 214, with the outcoupler 214 being optically aligned with an eye 216 of a user in the present example. In some embodiments, the laser projection system 200 is implemented in a wearable display system, such as the display system 100 of FIG. 1, or other display system.

The optical engine 202 includes one or more laser light sources configured to generate and output laser light 218 (e.g., visible laser light such as red, blue, and green laser light and, in some embodiments, non-visible laser light such as infrared laser light). In some embodiments, the optical engine 202 is coupled to a driver or other controller (not shown), which controls the timing of emission of laser light from the laser light sources of the optical engine 202 in accordance with instructions received by the controller or driver from a computer processor coupled thereto to modulate the laser light 218 to be perceived as images when output to the retina of an eye 216 of a user.

For example, during operation of the laser projection system 200, multiple laser light beams having respectively different wavelengths are output by the laser light sources of the optical engine 202, then combined via a beam combiner (not shown), before being directed to the eye 216 of the user. The optical engine 202 modulates the respective intensities of the laser light beams so that the combined laser light reflects a series of pixels of an image, with the particular intensity of each laser light beam at any given point in time contributing to the amount of corresponding color content and brightness in the pixel being represented by the combined laser light at that time.

Scan mirror 206 of the optical scanner 204 is a MEMS mirror in some embodiments. For example, scan mirror 206 is a MEMS mirror that is driven by respective actuation voltages to oscillate during active operation of the laser projection system 200, causing the first scan mirror 206 to scan the laser light 218. Oscillation of scan mirror 206 causes laser light 218 output by the optical engine 202 to be scanned through the transfer optic 210 and across a surface of the incoupler 212. In some embodiments, scan mirror 206 is a one-dimensional scan mirror that oscillates or otherwise rotates around a first axis 219 such that the laser light 218 is scanned in only one dimension (i.e., in a line) across the surface of the incoupler 212. In some embodiments, scan mirror 206 is a two-dimensional scan mirror that oscillates or otherwise rotates around the first axis 219 and a second axis 221. In some embodiments, the first axis 219 is skew with respect to the second axis 221.

According to various embodiments, the transfer optic 210 is a prism that receives the laser light 218 from the optical engine 202 and directs the laser light 218 to scan mirror 206. In some embodiments, the transfer optic 210 has a surface 208 configured to receive the laser light 218 at an angle greater than or equal to the critical angle to achieve TIR of the laser light. The transfer optic also has a surface 209, located opposite from surface 208 and proximate to scan mirror 206, configured to receive the laser light 218 at an angle less than the critical angle such that the laser light 218 is transmitted out of the transfer optic 210 to scan mirror 206. In the present example, "proximate" indicates that the distance between surface 209 and scan mirror 206 is equal to, or less than, 1.0 mm. Thus, laser light 218 reflected from surface 208 is transmitted through surface 209 to be incident on scan mirror 206.

In some embodiments, surface 208 is provided with a mirror coating or polarization-dependent filter, such as a polarization beam splitter (PBS) filter, to reflect all or some of the laser light 218 incident on surface 208. The transfer optic 210 also serves to transmit light 218 reflected from scan mirror 206 to the incoupler 212 without interfering with the path of the light 218 as it is input into the transfer optic 210 and reflected therewithin. In other words, the output path 220 of light reflected from scan mirror 206 does not interfere with the input path 222 of light provided to scan mirror 206. The transfer optic 210 also has surface 211 located proximate to the waveguide 205 such that light reflected from first scan mirror 206 is incident on the incoupler 212. In the present example, "proximate" indicates that the distance between surface 211 and waveguide 205 is equal to, or less than, 0.5 mm.

The waveguide 205 of the laser projection system 200 includes the incoupler 212 and the outcoupler 214. The term "waveguide," as used herein, will be understood to mean a combiner using one or more of total internal reflection (TIR), specialized filters, or reflective surfaces, to transfer light from an incoupler (such as the incoupler 212) to an outcoupler (such as the outcoupler 214). In some display applications, the light is a collimated image, and the waveguide transfers and replicates the collimated image to the eye. In general, the terms "incoupler" and "outcoupler" will be understood to refer to any type of optical grating structure, including, but not limited to, diffraction gratings, holograms, holographic optical elements (e.g., optical elements using one or more holograms), volume diffraction gratings, volume holograms, surface relief diffraction gratings, or surface relief holograms. In some embodiments, a given incoupler or outcoupler is configured as a transmissive grating (e.g., a transmissive diffraction grating or a transmissive holographic grating) that causes the incoupler or outcoupler to transmit light and to apply designed optical function(s) to the light during the transmission. In some embodiments, a given incoupler or outcoupler is a reflective grating (e.g., a reflective diffraction grating or a reflective holographic grating) that causes the incoupler or outcoupler to reflect light and to apply designed optical function(s) to the light during the reflection. In the present example, the laser light 218 received at the incoupler 212 is relayed to the outcoupler 214 via the waveguide 205 using TIR. The laser light 218 is then output to the eye 216 of a user via the outcoupler 214. As described above, in some embodiments the waveguide 205 is implemented as part of an eyeglass lens, such as the lens 108 or lens 110 (FIG. 1) of the display system having an eyeglass form factor and employing the laser projection system 200.

Although not shown in the example of FIG. 2, in some embodiments additional optical components are included in any of the optical paths between the optical engine 202 and the transfer optic 210, between the transfer optic 210 and the scan mirror 206, between the transfer optic 210 and the incoupler 212, between the incoupler 212 and the outcoupler 214, or between the outcoupler 214 and the eye 216 (e.g., in order to shape the laser light for viewing by the eye 216 of the user). For example, an optical relay, such as a lens-based or reflective optical relay, may be included between the transfer optic 210 and the incoupler 212. Also, in some embodiments, an exit pupil expander (e.g., an exit pupil expander 504 of FIG. 5, described below), such as a fold grating, is arranged in an intermediate stage between incoupler 212 and outcoupler 214 to receive light that is coupled into waveguide 205 by the incoupler 212, expand the light, and redirect the light towards the outcoupler 214, where the outcoupler 214 then couples the laser light out of waveguide 205 (e.g., toward the eye 216 of the user). It should be noted that that the optical paths of FIG. 2 are shown within the plane of the page (i.e., the XY plane). However, in some embodiments, some, or all, of the optical paths occupy various planes (e.g., the ZY or ZX plane, or intermediate planes therebetween).

Figure 3:
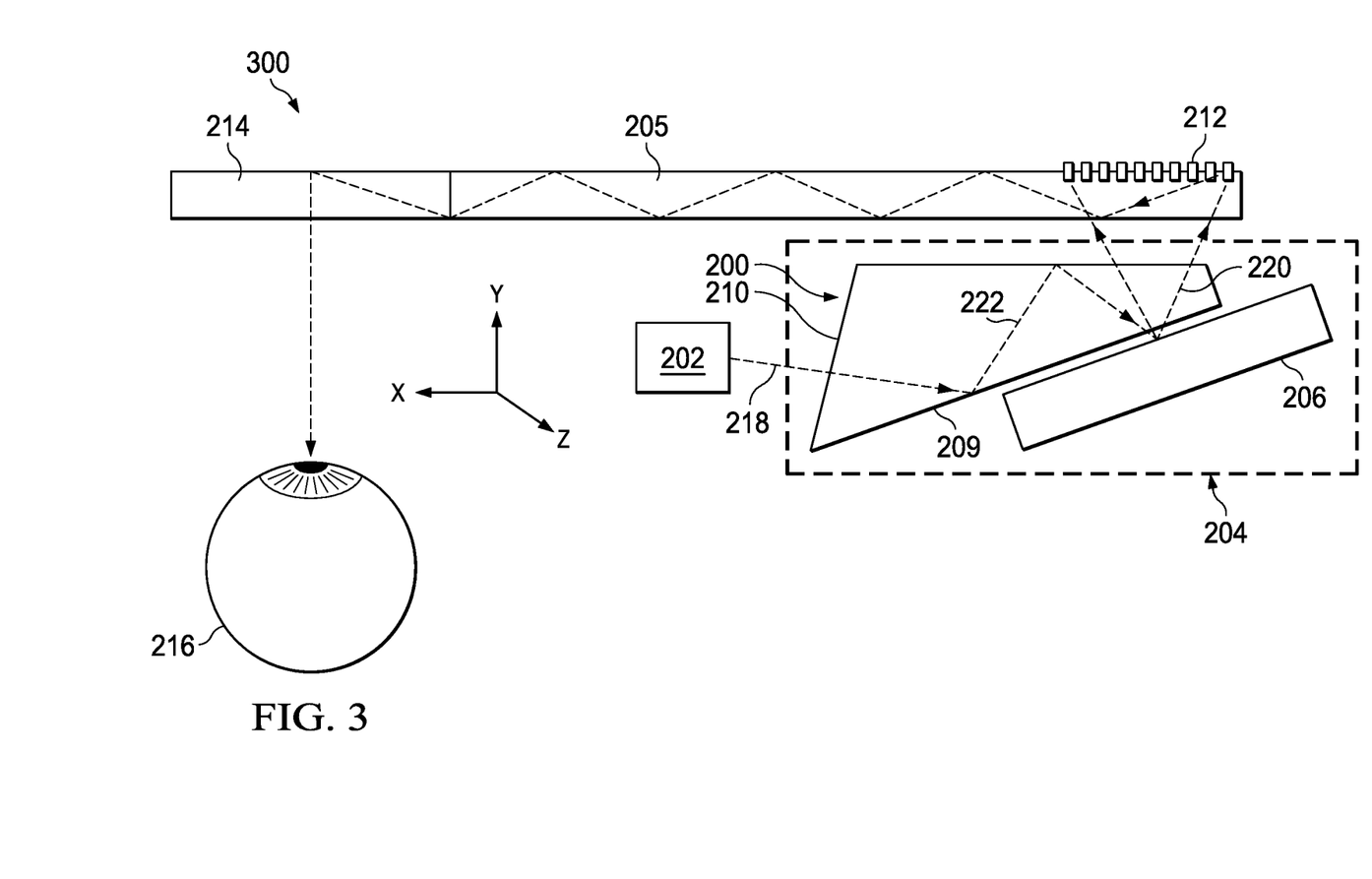
FIG. 3 shows a simplified block diagram of another laser projection system, including a transfer optic, that projects images directly onto the eye of a user via an image display system such as that shown in FIG. 1, in accordance with some embodiments.

FIG. 3 illustrates a simplified block diagram of another laser projection system 300, including transfer optic 210, that projects images directly onto the eye of a user via a waveguide, such as waveguide 205. In the configuration of laser projection system 300 in FIG. 3, the optical engine 202 is positioned relative to scan mirror 206 such that light 218 from the optical engine 202 is first incident on surface 209 of the transfer optic 210, which is located proximate to scan mirror 206.

The transfer optic 210 of laser projection system 300 is a prism that receives the laser light 218 from the optical engine 202 and directs the laser light 218 to the first scan mirror 206. In some embodiments, surface 209 of transfer optic 210 is configured to receive the laser light 218 at an angle greater than or equal to the critical angle to achieve TIR of the laser light. The transfer optic also has surface 208, located opposite from surface 209 and proximate to incoupler 212. Surface 208 is configured to TIR laser light 218 reflected from surface 209 and to receive the laser light 218 reflected from scan mirror 206 at an angle less than the critical angle for TIR such that the laser light 218 is transmitted out of the transfer optic 210 to incoupler 212. In some embodiments, either, or both, surface 208 and surface 209 is provided with a mirror coating or polarization-dependent filter, such as a polarization beam splitter (PBS) filter, to reflect some or all of the laser light 218 incident on the surface. The transfer optic 210 also serves to transmit light 218 reflected from scan mirror 206 to the incoupler 212 without interfering with the path of the light 218 as it is input into the transfer optic 210 from optical engine 202 and reflected therewithin. In other words, the output path 220 of light 218 reflected from scan mirror 206 does not interfere with the input path 222 of light 218 provided to scan mirror 206. It should be noted that that the optical paths of FIG. 3 are shown within the plane of the page (i.e., the XY plane). However, in some embodiments, some, or all, of the optical paths occupy various planes (e.g., the ZY or ZX plane, or intermediate planes therebetween).

Figure 4:
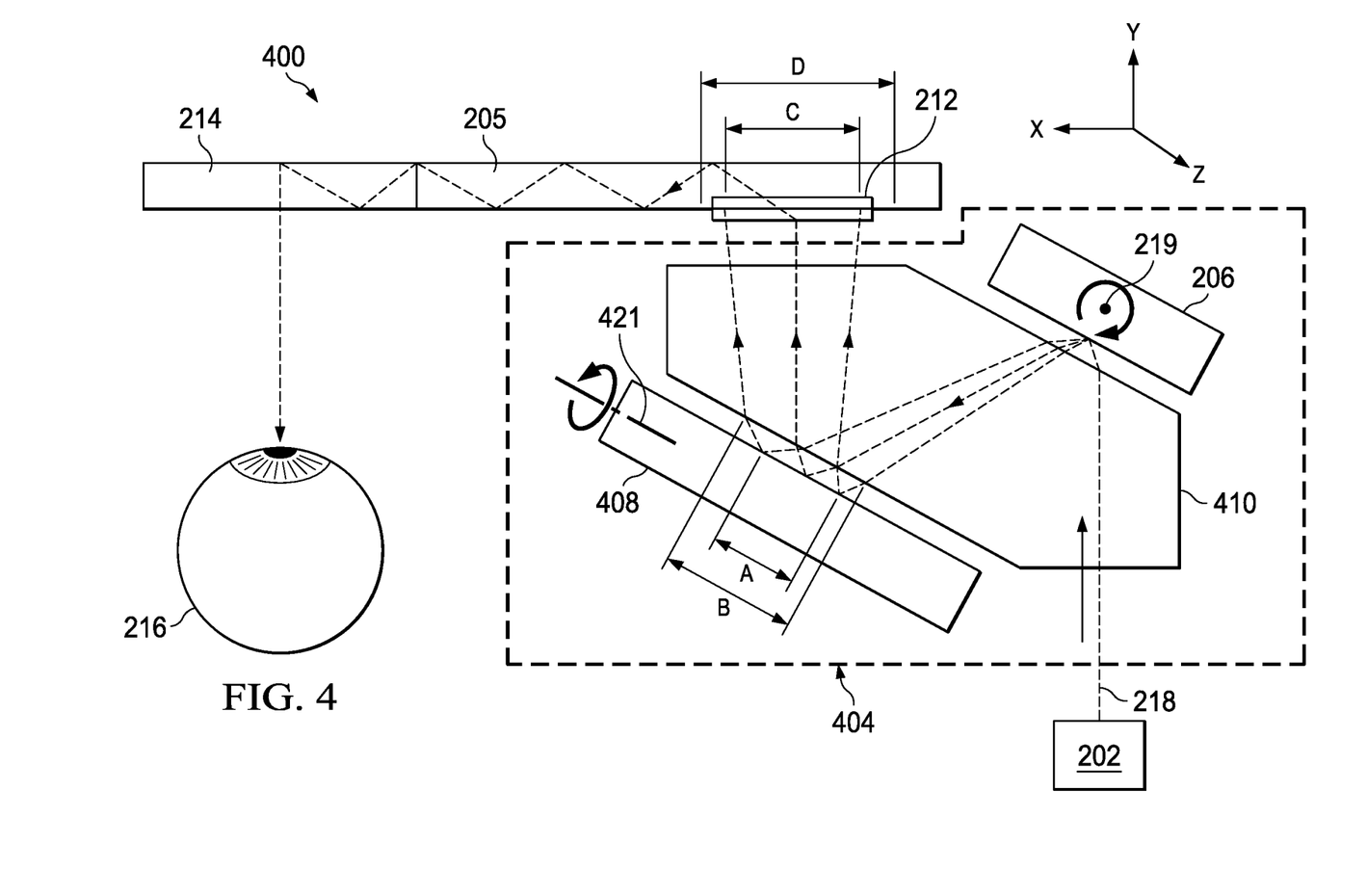
FIG. 4 illustrates a simplified block diagram of a laser projection system, including a transfer optic and multiple scan mirrors, that projects images directly onto the eye of a user via an image display system, such as the display system shown in FIG. 1, in accordance with some embodiments.

FIG. 4 illustrates a simplified block diagram of a laser projection system 400, including a transfer optic 210 and multiple scan mirrors 206, 408, that projects images directly onto the eye of a user via a display system, such as display system 100 shown in FIG. 1. The laser projection system 400 includes optical engine 202, an optical scanner 404, and waveguide 205. The optical scanner 404 includes a first scan mirror 206, a transfer optic 410, and a second scan mirror 408. The transfer optic 210 is generally disposed between the first scan mirror 206 and second scan mirror 408 with at least one surface of the transfer optic 210 being disposed proximate to an incoupler 212 of a waveguide. The waveguide 205 further includes an outcoupler 214, with the outcoupler 214 being optically aligned with an eye 216 of a user in the present example. In some embodiments, the laser projection system 400 is implemented in a wearable heads-up display or other display system, such as the display system 100 of FIG. 1.

One or both of the first and second scan mirrors 206 and 408 of the optical scanner 404 are one-dimensional MEMS mirrors in some embodiments. For example, the first scan mirror 206 and the second scan mirror 408 are MEMS mirrors that are driven by respective actuation voltages to oscillate during active operation of the laser projection system 400, causing the first and second scan mirrors 206 and 408 to scan the laser light 218. Laser light 218 output from the optical engine 202 is provided to the transfer optic 410, which transmits the laser light 218 to the first scan mirror 206. Oscillation of the first scan mirror 206 causes the laser light 218 output by the optical engine 202, and directed by the transfer optic 410, to be scanned back through the transfer optic 410 and across a surface of the second scan mirror 408. The second scan mirror 408 scans the laser light 218 received from the first scan mirror 206 toward an incoupler 212 of the waveguide 205. In some embodiments, the first scan mirror 206 oscillates or otherwise rotates around a first axis 219, such that the laser light 218 is scanned in only one dimension across the surface of the second scan mirror 408. In some embodiments, the second scan mirror 408 oscillates or otherwise rotates around a second axis 421 such that laser light 218 is scanned in one dimension across the incoupler 212. In some embodiments, the first axis 219 is skew with respect to the second axis 421.

The transfer optic 210, in some embodiments, is a prism with an index of refraction configured to reduce the refraction angle of the beams of light reflected from a scan mirror, such as first scan mirror 206 and/or second scan mirror 408, such that the overall size of the combined beams of reflected light is smaller than if the beams traveled through the air. In the example of laser projection system 400, consolidation of the beam of light reflected from first scan mirror 206 by the transfer optic 410 means that second scan mirror 408 can be smaller than a typical scan mirror used in a conventional laser projector system. For example, width A of the combined beam reflected from first scan mirror 206 that is incident on the second scan mirror 408 is smaller than width B, which represents the width of the combined beam if it had not been refracted by transfer optic 410. In addition, width C of the combined beam reflected from second scan mirror 408 that is incident on the incoupler 212 is smaller than width D, which represents the width of the combined beam if it had not been refracted by transfer optic 410. Thus, transfer optic 410 allows for the use of a smaller second scan mirror and incoupler compared to the size of a second scan mirror and incoupler in a system without a transfer optic. As the power to articulate a scan mirror is proportional to its size, a smaller scan mirror utilizes less power, thus potentially increasing the operating time and/or reducing the battery size of a WHUD employing the transfer optic 410. Conversely, if a larger FOV is desired, the consolidating effect of the transfer optic 410 allows for a larger combined beam of light to be input to the optical scanner 404 without necessitating a larger scan mirror. It should be noted that that the optical paths of FIG. 4 are shown within the plane of the page (i.e., the XY plane). However, in some embodiments, some or all of the optical paths occupy various planes (e.g., the ZY or ZX plane, or intermediate planes therebetween).

Figure 5:
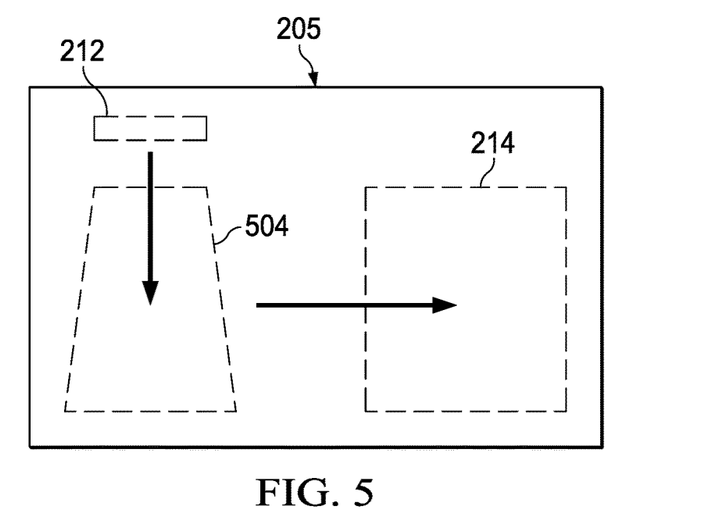
FIG. 5 shows an example of light propagation within the waveguides of the laser projection systems shown in FIGS. 2-4, in accordance with some embodiments.

FIG. 5 shows an example of light propagation within the waveguide 205 of the laser projection systems 200, 300, and 400 of FIGS. 2-4, in accordance with some embodiments. As shown, light received via the incoupler 212 is directed into an exit pupil expander 504 and is then routed to the outcoupler 214 to be output (e.g., toward the eye of the user). In some embodiments, the exit pupil expander 504 expands one or more dimensions of the eyebox of a WHUD that includes the laser projection systems 200, 300, or 400 (e.g., with respect to what the dimensions of the eyebox of the WHUD would be without the exit pupil expander 504). In some embodiments, the incoupler 212 and the exit pupil expander 504 each include respective one-dimensional diffraction gratings (i.e., diffraction gratings that extend along one dimension), which diffract incident light in a particular direction depending on the angle of incidence of the incident light and the structural aspects of the diffraction gratings. It should be understood that FIG. 5 shows a substantially ideal case in which the incoupler 212 directs light straight down (with respect to the presently illustrated view) and the exit pupil expander 504 directs light to the right (with respect to the presently illustrated view) in a second direction that is perpendicular to the first direction. While not shown in the present example, it should be understood that, in some embodiments, the first direction in which the incoupler 212 directs light is slightly or substantially diagonal, rather than exactly perpendicular.

Figure 6:
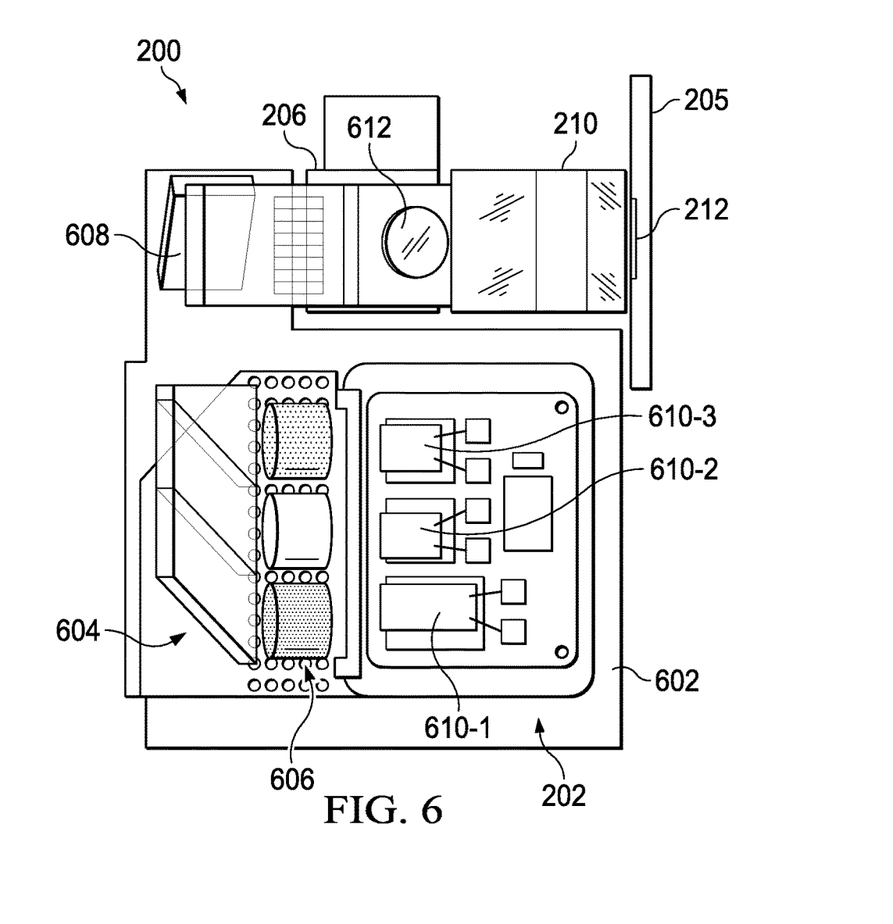
FIG. 6 illustrates an example embodiment of the laser projection system shown in FIG. 2, including the optical engine, in accordance with some embodiments.

FIG. 6 illustrates an example embodiment of laser projection system 200 shown in FIG. 2, including the optical engine 202, in accordance with some embodiments. As shown, the optical engine 202 includes a substrate 602 on which a beam combiner 604, primary lenses 606, and a mirror 608 are disposed. According to various embodiments, the substrate 602 is a printed circuit board (PCB) or otherwise another applicable substrate.

The optical engine 202 comprises a set of one or more laser light sources 610 (e.g., laser diodes), such as the illustrated red laser light source 610-1, green laser light source 610-2, and blue laser light source 610-3, wherein a processor or other controller operates the optical engine 202 to modulate the respective intensity of each laser light source 610 so as to provide a corresponding red light, green light, and blue light contribution to a corresponding pixel of an image being generated for display to the user. The primary lenses 606 includes a corresponding number of collimation lenses (e.g., three for the three laser light sources 610 in the example above), each interposed in the light path between a respective laser light source 610 of the optical engine 202 and the beam combiner 604. For example, each laser light source 610 outputs a different wavelength of laser light (e.g., corresponding to respective red, blue, and green wavelengths) through the primary lenses 606 to be combined at the beam combiner 604 to produce the laser light (i.e., laser light 218 shown in FIG. 2) to be projected by the laser projection system 200, 300, 400. The beam combiner 604 receives the individual laser light inputs and outputs a combined laser light 218 to the mirror 608, which redirects the laser light 218 onto a reflective surface 612 of scan mirror 206. In an embodiment in which scan mirror 206 is a one-dimensional scan mirror, scan mirror 206 scans the laser light 218 into the transfer optic 210 across a first scanning axis. In an embodiment in which scan mirror 206 is a two-dimensional scan mirror, scan mirror 206 scans the laser light 218 across multiple scanning axes. The transfer optic 210 is configured to route the laser light 218 toward incoupler 212 of waveguide 205.

Figure 7:
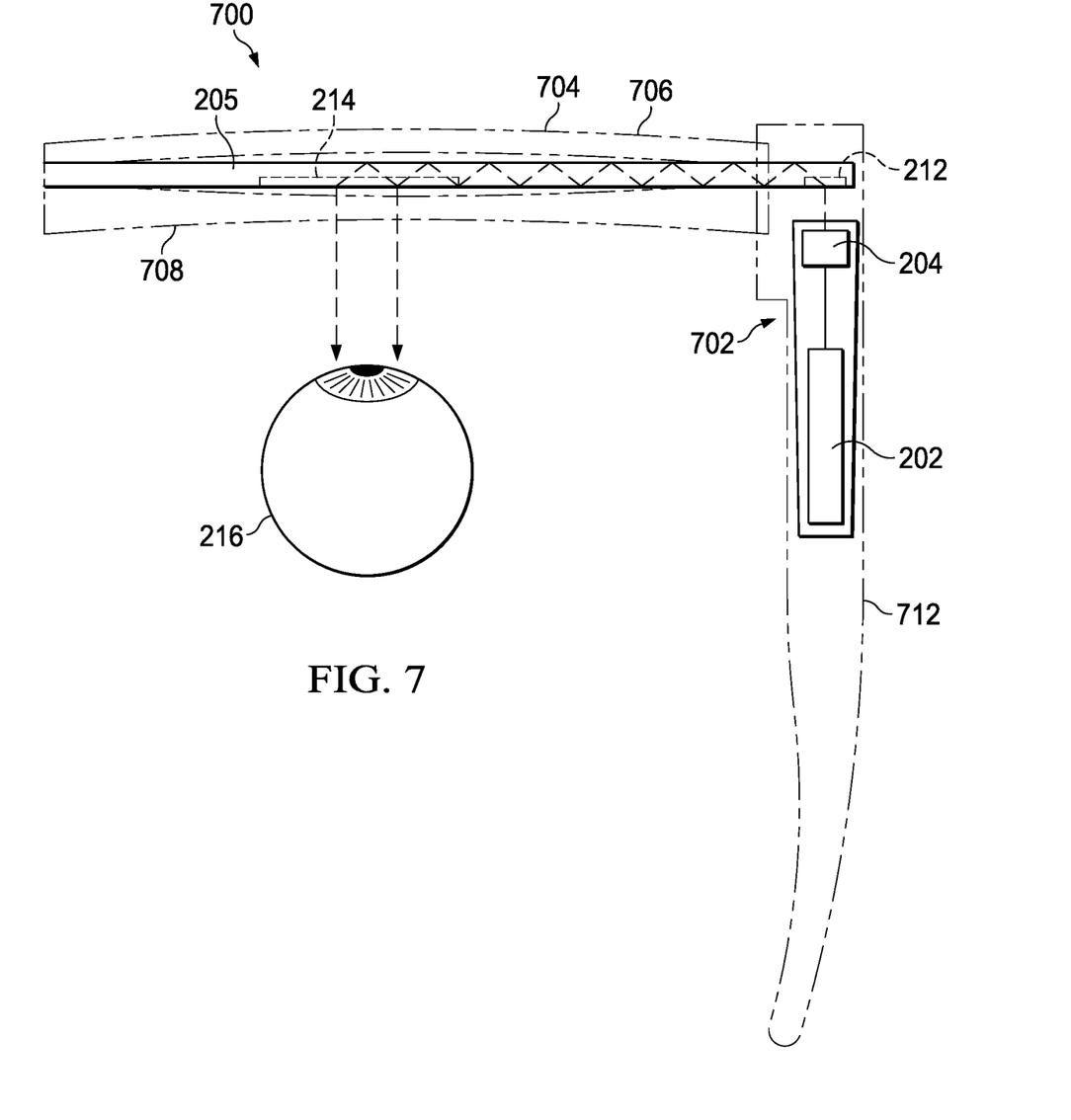
FIG. 7 illustrates a portion of a WHUD that includes a laser projection system, such as one of the laser projection systems shown in FIGS. 2-4, in accordance with some embodiments.

FIG. 7 illustrates a portion of a display system (i.e., a WHUD) 700 that includes a laser projection system 702, such as laser projection systems 200, 300, and 400 of FIGS. 2-4. In some embodiments, the WHUD 700 represents the display system 100 of FIG. 1. The optical engine 202, optical scanner 710 (which corresponds to, for example, optical scanners 204 or 404 of FIGS. 1, 2, and 4), incoupler 212, and a portion of the waveguide 205 are included in an arm 712 of the WHUD 700, in the present example.

The WHUD 700 includes an optical combiner lens 704, which includes a first lens 706, a second lens 708, and the waveguide 205, with the waveguide 205 disposed between the first lens 706 and the second lens 708. Light exiting through the outcoupler 214 travels through the second lens 708 (which corresponds to, for example, the lens element 110 of the display system 100). In use, the light exiting second lens 708 enters the pupil of an eye 216 of a user wearing the WHUD 700, causing the user to perceive a displayed image carried by the laser light output by the optical engine 202. The optical combiner lens 704 is substantially transparent, such that light from real-world scenes corresponding to the environment around the WHUD 700 passes through the first lens 706, the second lens 708, and the waveguide 205 to the eye 216 of the user. In this way, images or other graphical content output by the laser projection system 702 are combined (e.g., overlayed) with real-world images of the user's environment when projected onto the eye 216 of the user to provide an AR experience to the user.

Figure 8:
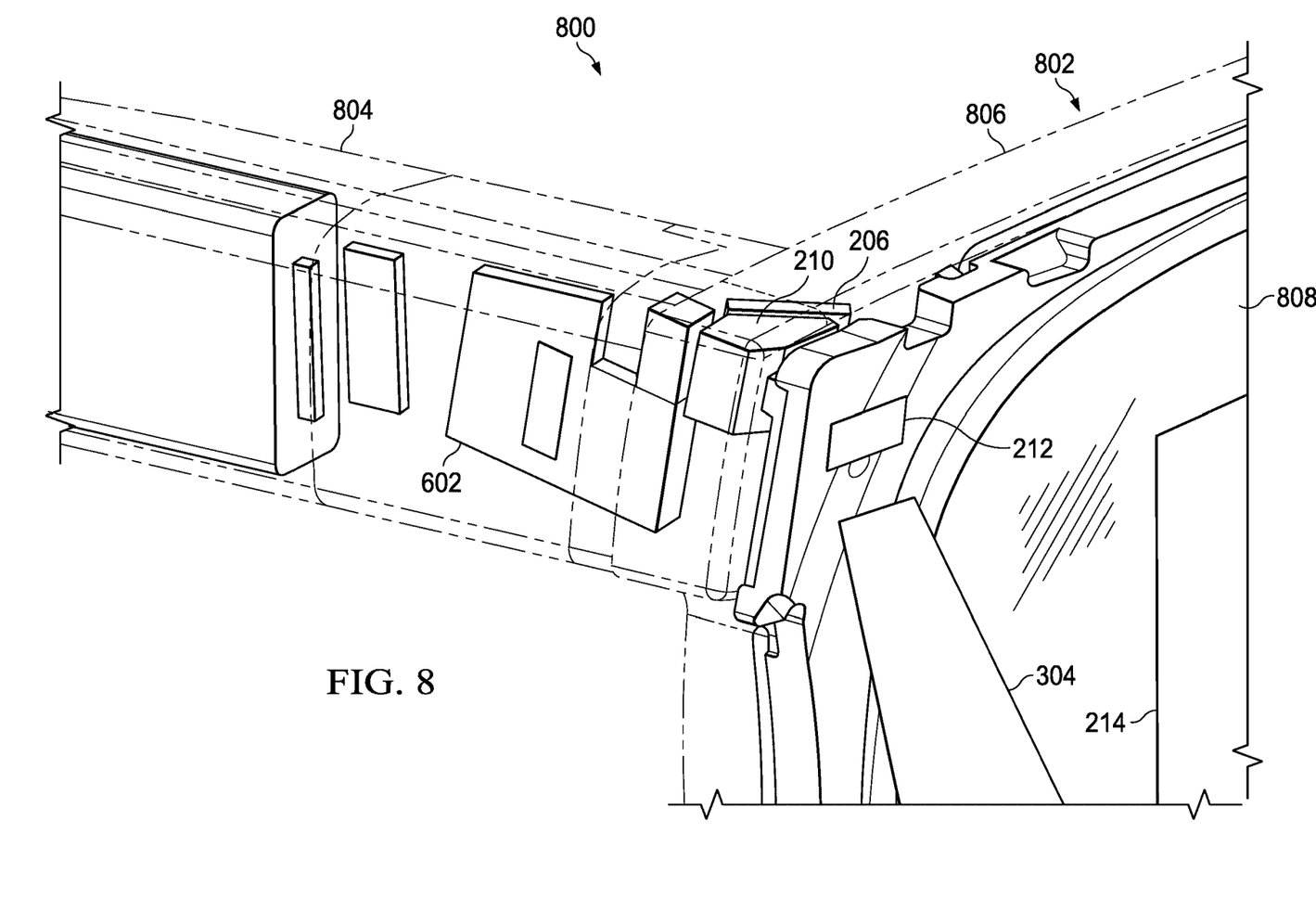
FIG. 8 shows a perspective, partially transparent view of a WHUD, which represents the WHUD of FIG. 7 or the display system 100 of FIG. 1, in accordance with some embodiments.

FIG. 8 shows a perspective, partially transparent view 800 of a WHUD 802, which represents the WHUD 700 of FIG. 7 or the display system 100 of FIG. 1. The WHUD 802 includes an example arrangement of the laser projection system 200 of FIG. 2 in which the transfer optic 210 is configured with at least one reflective surface. In some embodiments, the WHUD 802 corresponds to the display system 100 of FIG. 1, and the illustrated portion of the WHUD 802 corresponds to the region 112 of the display system 100.

The arm 804 of the WHUD 802 houses the optical engine 202, the primary lenses 406, and the substrate 602. A frame section 806 of the WHUD 802 houses scan mirror 206 and transfer optic 210. The incoupler 212 and the outcoupler 214 of the waveguide 205 (not fully shown in the views of FIG. 8) are each embedded in or otherwise disposed on the lens 808 (one embodiment of, for example, lens 110 of FIG. 1). As described previously, laser light output by the optical engine 202 (e.g., laser light 218, FIG. 5) is routed to the incoupler 212 via at least scan mirror 206 and the transfer optic 210. Scan mirror 206 oscillates or otherwise rotates to scan the laser light along a first scanning axis. Laser light reflected by scan mirror 206 is incident on the incoupler 212. Light received at the incoupler 212 is routed to the outcoupler 214 via the waveguide 205. The laser light received at the outcoupler 214 is then directed out of the waveguide 205 (e.g., toward the eye of a user of the WHUD 802).

In an example embodiment, a system includes an optical scanner comprising a first scan mirror disposed proximate to a transfer optic; an optical engine configured to provide light to the optical scanner; and a waveguide comprising an incoupler disposed proximate to the transfer optic. In some embodiments, the transfer optic is configured to direct the light from the optical engine to the first scan mirror and to transmit light reflected from the first scan mirror to one of a second scan mirror or the incoupler.

In some embodiments, the first scan mirror is articulated by a micro-electromechanical system (MEMS) to reflect light received from the transfer optic over a range of angles.

In some embodiments, the transfer optic is a prism having at least one reflective surface.

In some embodiments, the transfer optic is a prism having at least one surface angled relative to the path of the light from the optical engine to achieve total internal reflection (TIR) of the light received from the optical engine.

In some embodiments, the second scan mirror is disposed proximate to the transfer optic and positioned to receive light transmitted from the first scan mirror through the transfer optic.

In some embodiments, the second scan mirror is articulated by a MEMS to reflect the received light towards the incoupler over a range of angles.

In some embodiments, wherein the transfer optic is a prism having a higher index of refraction than air.

An example method includes receiving light from an optical engine at a transfer optic disposed proximate to a first scan mirror; reflecting the received light from a surface of the transfer optic at least once; subsequent to reflecting the light from the surface of the transfer optic, transmitting the reflected light to the first scan mirror; and reflecting the transmitted light from the first scan mirror to one of a second scan mirror or an incoupler of a waveguide.

In some embodiments, the first scan mirror is articulated by a micro-electromechanical system (MEMS) to reflect light transmitted from the transfer optic over a range of angles.

In some embodiments, the transfer optic is a prism having at least one reflective surface.

In some embodiments, the transfer optic is a prism having at least one surface angled relative to the path of the light from the optical engine to achieve total internal reflection (TIR) of the light received from the optical engine.

In some embodiments, the second scan mirror is disposed proximate to the transfer optic and positioned to receive light transmitted from the first scan mirror through the transfer optic.

An example wearable heads-up display (WHUD) includes an optical engine; a waveguide having an incoupler; a transfer optic disposed in an optical path of light provided from the optical engine to the incoupler; and a first scan mirror disposed in the optical path and proximate to a first surface of the transfer optic. In some embodiments, the incoupler is disposed proximate to a second surface of the transfer optic.

In some embodiments, the first scan mirror is articulated by a micro-electromechanical system (MEMS) to reflect light received from the transfer optic over a range of angles.

In some embodiments, the transfer optic is a prism having at least one reflective surface.

In some embodiments, the transfer optic is a prism having at least one surface angled relative to the path of the light from the optical engine to achieve total internal reflection (TIR) of the light received from the optical engine.

In some embodiments, the WHUD includes a second scan mirror disposed proximate to a third surface of the transfer optic and positioned to receive light transmitted from the first scan mirror through the transfer optic.

In some embodiments, the second scan mirror is articulated by a MEMS to reflect the received light towards the incoupler over a range of angles.

In some embodiments, the transfer optic is a prism having a higher index of refraction than air.

In some embodiments, the second scan mirror is configured to scan the light received from the transfer optic over a range of angles different from a range of angles over which the first scan mirror is configured to scan the light.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A system comprising:
    a transfer optic;
    an optical scanner comprising a first scan mirror disposed proximate to the transfer optic and to receive light from an optical engine; and
    a waveguide comprising an incoupler disposed proximate to the transfer optic,
    wherein the transfer optic is configured to direct the light from the optical engine to the first scan mirror and to transmit light reflected from the first scan mirror to a second scan mirror, and to transmit light reflected from the second scan mirror to the incoupler.

2. The system of claim 1, wherein the first scan mirror is articulated by a micro-electromechanical system (MEMS) to reflect light received from the transfer optic over a range of angles.

3. The system of claim 1, wherein the transfer optic is a prism having at least one mirror coated surface.

4. The system of claim 1, wherein the transfer optic is a prism having at least one surface angled relative to a path of the light from the optical engine to achieve total internal reflection (TIR) of the light received from the optical engine.

5. The system of claim 1, wherein the second scan mirror is articulated by a MEMS to reflect the received light towards the incoupler over a range of angles.

6. The system of claim 1, wherein the transfer optic is a prism having a higher index of refraction than air.

7. A method comprising:
    receiving light from an optical engine at a transfer optic disposed proximate to a first scan mirror;
    reflecting the light from a surface of the transfer optic at least once;
    subsequent to reflecting the light from the surface of the transfer optic, transmitting the reflected light to the first scan mirror; and
    reflecting the transmitted reflected light from the first scan mirror to one of a second scan mirror; and
    subsequent to reflecting the transmitted reflected light, transmitting light received from the second scan mirror to an incoupler of a waveguide.

8. The method of claim 7, wherein the first scan mirror is articulated by a micro-electromechanical system (MEMS) to reflect light transmitted from the transfer optic over a range of angles.

9. The method of claim 7, wherein the transfer optic is a prism having at least one reflective surface.

10. The method of claim 7, wherein the transfer optic is a prism having at least one surface angled relative to a path of the light from the optical engine to achieve total internal reflection (TIR) of the light received from the optical engine.

11. The method of claim 7, wherein the second scan mirror is disposed proximate to the transfer optic and positioned to receive light transmitted from the first scan mirror through the transfer optic.

12. A wearable heads-up display (WHUD) comprising:
an optical engine;
a waveguide having an incoupler;
a transfer optic disposed in an optical path of light provided from the optical engine to the incoupler;
a first scan mirror disposed in the optical path and proximate to a first surface of the transfer optic; and
a second scan mirror disposed in the optical path and proximate to a second surface of the transfer optic, and
wherein the transfer optic is configured to direct the light from the optical engine to the first scan mirror and to transmit light received from the first scan mirror to the second scan mirror, and to transmit light received from the second scan mirror to the incoupler.

13. The WHUD of claim 12, wherein the first scan mirror is articulated by a micro-electromechanical system (MEMS) to reflect light received from the transfer optic over a range of angles.

14. The WHUD of claim 12, wherein the transfer optic is a prism having at least one reflective surface.

15. The WHUD of claim 12, wherein the transfer optic is a prism having at least one surface angled relative to a path of the light from the optical engine to achieve total internal reflection (TIR) of the light received from the optical engine.

16. The WHUD of claim 12, wherein the second scan mirror is articulated by a MEMS to reflect the received light towards the incoupler over a range of angles.

17. The WHUD of claim 12, wherein the transfer optic is a prism having a higher index of refraction than air.

18. The WHUD of claim 12, wherein the second scan mirror is configured to scan the light received from the transfer optic over a range of angles different from a range of angles over which the first scan mirror is configured to scan the light.

* * * * *